United States Patent [19]

Strelow

[11] 4,400,792
[45] Aug. 23, 1983

[54] DUAL-CHANNEL DATA PROCESSING SYSTEM FOR RAILROAD SAFETY PURPOSES

[75] Inventor: Horst Strelow, Cremlingen, Fed. Rep. of Germany

[73] Assignee: Siemens Aktiengesellschaft, Berlin & Munich, Fed. Rep. of Germany

[21] Appl. No.: 225,798

[22] Filed: Jan. 16, 1981

[30] Foreign Application Priority Data

Jan. 30, 1980 [DE] Fed. Rep. of Germany ....... 3003291

[51] Int. Cl.³ .................. G06F 15/16; G06F 11/00
[52] U.S. Cl. ..................................... 364/900; 371/68
[58] Field of Search ... 364/200 MS File, 900 MS File; 371/14, 68

[56] References Cited

U.S. PATENT DOCUMENTS

| | | | |
|---|---|---|---|
| 4,012,717 | 3/1977 | Censier et al. | 364/200 |
| 4,149,069 | 4/1979 | Strelow | 371/68 |
| 4,198,678 | 4/1980 | Maatje et al. | 371/68 |
| 4,270,168 | 5/1981 | Murphy et al. | 364/200 |
| 4,309,768 | 1/1982 | Ault | 371/68 |

FOREIGN PATENT DOCUMENTS 2319753 11/1973 Fed. Rep. of Germany .

Primary Examiner—Felix D. Gruber
Assistant Examiner—Douglas H. Rutherford
Attorney, Agent, or Firm—Hill, Van Santen, Steadman & Simpson

[57] ABSTRACT

A respective microcomputer is provided for each processing channel in a data processing system constructed according to safety principles. The information to be output to the process are determined by both microcomputers and are supplied in pairs to two non-fail-safe comparators which drive respective AND gates. Each of the AND gates drives a respective amplifier. The power supply of one amplifier occurs from a battery or the like and the power supply of the other amplifier occurs by transformer-coupled output signals of the first amplifier, which signals are then rectified. The information required for the process are coupled via at least one further amplifier whose power supply is provided by a transformer-coupled and rectified output signal of the second amplifier. Given a signal discrepancy between the two microcomputers, information is not permitted to the process which could lead to a dangerous situation.

3 Claims, 1 Drawing Figure

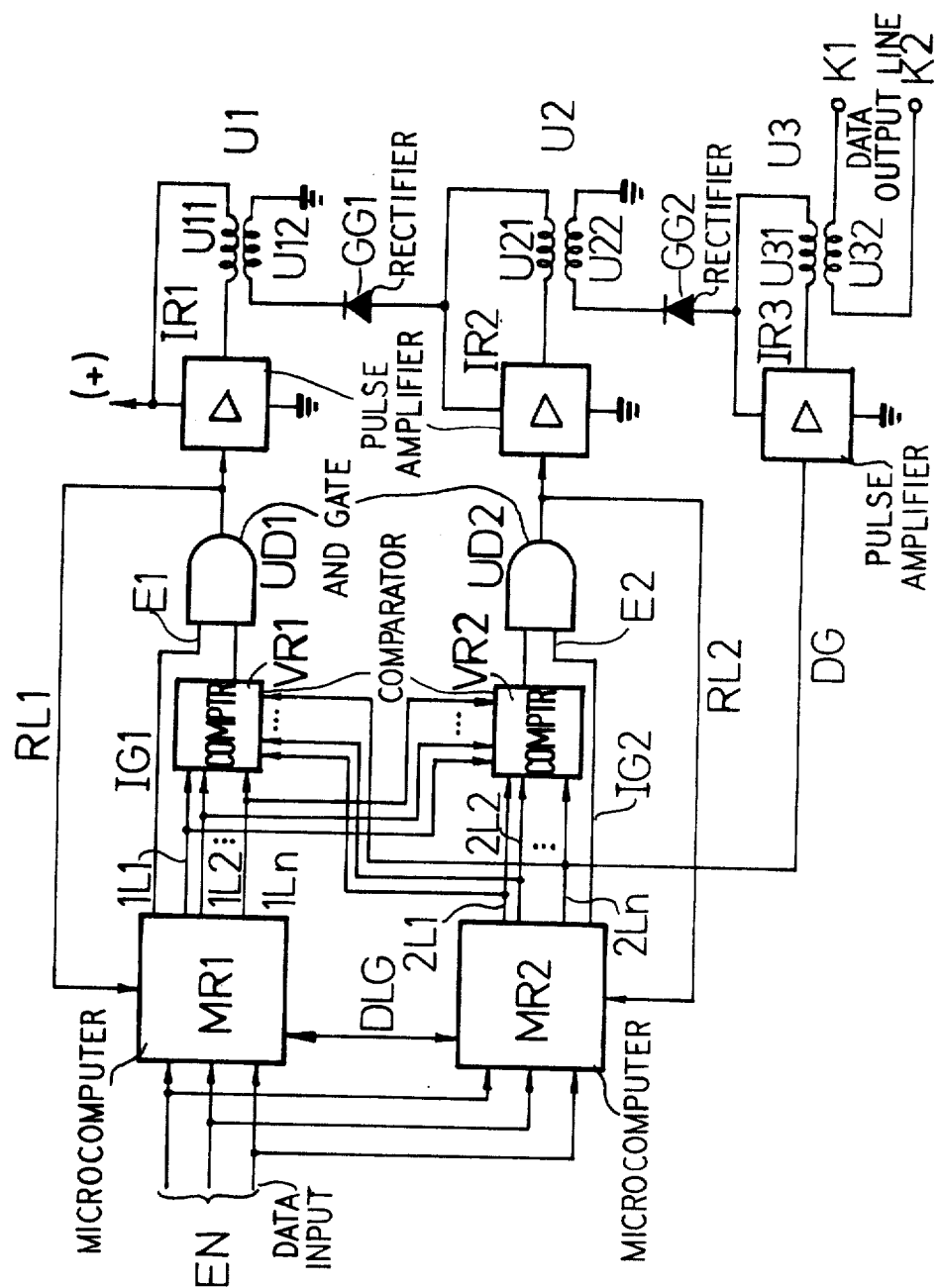

DUAL-CHANNEL DATA PROCESSING SYSTEM FOR RAILROAD SAFETY PURPOSES

BACKGROUND OF THE INVENTION

1. Field of the Invention

The present invention relates to a dual-channel data processing system for railroad safety purposes having two microcomputers processing the same data, a respective comparator being assigned to each microcomputer for the information to be compared, the comparators, given coincidence information, emitting a switching command by way of a respective output.

2. Description of the Prior Art

Switching devices employed in railroad safety systems must often assume responsibility for safety. This is true of signaling systems, line devices for train control or devices on the rail vehicles themselves. For this reason, data processing systems which are increasingly realized by microcomputers must operate according to recognized safety principles according to which, given technical faults which may potentially occur, the process, i.e. the railroad to be controlled, must be placed into a state which does not endanger persons. This, for example, can occur in that, while employing the philosophy of safety recognized for many years in the area of railroad safety, all signals deemed to be dangerous have a high signal level or an alternating voltage assigned thereto which, given a disruption of the appertaining data processing system, is switching off in all output channels. To this end, however, devices are required which recognize faulty data processing soon enough that the control commands determined by a faulty data processing system do not participate in the control process.

In a known data processing system of the type generally mentioned above, for example in the German published application 2,319,753, in order to increase the reliability of the overall system, a transfer, after the occurrence of a fault in a first of two data processing systems, is undertaken to the other data processing system which constantly operates in parallel thereto and of which it is assumed did not likewise become defective at the same point in time. In these known two-out-of-two system which of the two data processing systems supplies a faulty result in the disruptive case can only be determined at an extra expense.

In view of the required safety, a limitation to such effect that only specific system parts of a redundant data processing system are switched off cannot occur because no sufficiently safe fault recognition mechanism is provided for this purpose. Therefore, there would also be no purpose to continue operations with only one computer perceived to be intact, because the computer, due to a lack of a safe fault recognition system, can endanger persons and property when operating alone.

SUMMARY OF THE INVENTION

Therefore, the object of the present invention is to provide an improved dual-channel data processing system of the type generally mentioned above for use in the area of railroad safety systems such effect, upon use of non-failsafe comparators and upon avoidance of special modules, it is guaranteed that, given identification of a signal discrepancy between the two data procession systems, it is assured that no signals endangering the process are emitted.

The above object is achieved, according to the present invention, in that an AND circuit is connected to the output of each of the two comparators, a second input of each of the AND circuits receiving an information-free pulse. A separate pulse amplifier is connected to the outputs of each AND circuit, of which one receives the energy required for its operation from a power supply and the other receives its operating energy from transformer-coupled and rectified output signals of the preceding pulse amplifier. The active output circuits are provided between the outputs of one of the two microprocessors and the devices for receiving signals. The power supply to the active output circuits, also in the form of pulse amplifiers, is transformer-coupled and rectified from the preceding pulse amplifier circuit.

In an advantageous manner, each of the two AND circuits, with respect to the power supply, and with an information-free pulse, can be connected to the clock current supply of the assigned microcomputer. The particular advantage of the invention, in a dual-channel data processing system, lies in the particularly simple linkage of the two channels via the power supply of the pulse amplifiers so that, even as a result of component failures in the modules, no orderly state can be simulated in an undesirable manner.

An advantageous further development of the invention provides that the output of each AND circuit is connected to an input of the assigned microcomputer. By such a feedback of the pulses existing at the outputs of the two AND circuits, and given a proper condition of the overall switching device to the allocated processing unit, it is possible to undertake a channel-specific check from time to time. Thereby, the respective check duration must be shorter than the shortest reaction time of setting elements of the railroad system controlled by a data processing system.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic representation of a dual-channel processing system constructed in accordance with the invention.

DESCRIPTION OF THE PREFERRED EMBODIMENTS

Referring to the drawing, at the left, the drawing illustrates two microcomputers MR1 and MR2 of a dual-channel data processing system which receive all the information of importance for the control of a railroad safety system via input lines EN representing a multitude of input lines. Likewise representing a multitude of lines, a data output line DG is connected to the microcomputer MR2, the information of the data output line being available at two terminals K1 and K2 serving as the data output for a setting element of the railroad safety system. Various outputs of the microcomputer MR1 are referenced 1L1, 1L2–1Ln and of the microcomputer MR2 are referenced 2L1, 2L2–2Ln. The microcomputer outputs can carry a multitude of different signals, for example, data and/or control information, or even addresses. All of the information are capable of being compared, respectively in pairs, so that a discrepancy in the operating mode of the two microcomputers MR1 and MR2 can be identified as quickly as possible. For the purpose of fault recognition, two comparators VR1 and VR2 are assigned to the two microcomputers MR1 and MR2. The comparators are connected to the outputs 1L1–1Ln and 2L1–2Ln of the microcomputers MR1 and MR2. What is significant for the present two-out-of-two system is that, with the assistance of the comparators VR1 anf VR2—which need not absolutely be constructed of failsafe modules—switching commands can be derived which, in the case of a fault, does not permit a signal for the setting element (not illustrated) to be controlled to be output to the terminals K1 and K2 with certainty. Therefore, an AND gate UD1 or, respectively, UD2 is connected to the comparators VR1 and VR2, the AND gates being connected via a second input E1 or, respectively, E2 and a control line IG1 or, respectively, IG2 to the microcomputer MR1 or, respectively, MR2 present in the appertaining processing channel. Information-free pulses from the clock current supply of the assigned microcomputer arrive via the control lines IG1 and IG2 to the assigned AND gates UD1, UD2; however, a common, discrete pulse source may be provided. What is achieved by the circuit measure set fourth above is that rectangular signals always appear at the output of the AND gate UD1 and the AND gate UD2 when the comparator VR1 and the comparator VR2 have identified a proper condition, i.e. equivalent signals exist from both microcomputers MR1 and MR2. The rectangular signals then output by the AND gates UD1 and UD2 arrive at the first and second amplifiers IR1, IR2. With respect to its power supply, the pulse amplifier IR1 is connected to an existing voltage source as is indicated by the reference (+). The second pulse amplifier IR2 is not fed from this voltage source; on the contrary, the energy supply occurs from the output circuit of the properly operating pulse amplifier IR1 which, of course, must be driven with rectangular signals for that purpose. For the purpose of power supply, a transformer U1 with a primary winding U11 and a secondary winding U12 is connected in the output circuit of the pulse amplifier IR1. A rectifier circuit GG1 is connected to the latter secondary winding U12, the rectifier circuit GG1, in turn, feeding the pulse amplifier IR2, as well as the primary winding U21 of a transformer U2 connected in the output circuit of the pulse amplifier IR2. Finally, via a further rectifier circuit GG2, the secondary winding U22 of the transformer U2 feeds a pulse amplifier IR3 connected to the data output line DG as well as the primary winding U31 of a further transformer U3 to whose secondary winding U32 the terminals K1 and K2 forming the data output are connected. Of course, in practical operation, significantly more output lines corresponding to the data output line DG are provided. In this case, a multitude of pulse amplifiers is also provided, these being preferably supplied with energy via the rectifier circuit GG2.

What is characteristic for the dual-channel data processing system described above is that the output of signals is suppressed not only when one of the microcomputers MR1 or MR2 operates defectively but, rather, also when, as a result of the fault in the comparator VR1 or VR2 or the AND gates UD1 or UD2, the respective microcomputer is switched off, or at least placed in a predetermined state. Even given a fault in the AND gates or in one of the pulse amplifiers IR1 and IR2, the data output which is not desired in the case of a fault is likewise suppressed. A respective line RL1 and RL2 which is connected to the appertaining microcomputer MR1 or MR2 is connected to the output of the respective AND gates UD1 and UD2. It is possible with the assistance of such a feedback to periodically test the operability of the comparator VR1 or the comparator VR2 and of the respective AND gates UD1 and UD2 in a channel-specific manner by providing unequal data which are intentionally output, so that it is guaranteed that the appertaining comparator in the case of a fault of an applied, anti-valent signal pair, indeed no longer emits an output signal, so that the respective pulse amplifier IR1 or IR2 is shut off. In this test, the check duration must be shorter than the shortest reaction time of the setting element connected to the terminals K1 and K2.

On the basis of the above test, it is advantageously possible to continuously check the dual-channel data processing system as to its proper operation at regular intervals independently of the operational action and, therefore, to detect a first fault in one of the circuit elements VR1, VR2, UD1 or UD2 early. Then, such a data exchange can occur via the data exchange line DLG connecting the two microcomputers MR1 and MR2 that the entire system is shut down. This, for example, is possible in that the two comparators VR1 and VR2 are placed in a fixed unequal condition with respect to their input signals, this condition being maintained even when both microcomputers MR1 and MR2 are switched off.

When the microcomputers MR1 and MR2 receive unequal signals via the lines RL1 and RL2 beyond the check intervals, then they can be transferred into a specific state, for example, a processing standstill, which also incorporates the blockage of the information high frequency pulses via the lines IG1 and IG2 as at least one of the comparators VR1 or VR2 continuously reports "unequal" and the respective AND gate UD1 or UD2 blocks, and the input of the appertaining pulse amplifier IR1 or IR2 is permanently blocked, whereby the rectifier circuit GG1 is no longer supplied with energy. This particularly applies for the rectifier circuit GG2 with certainty.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A dual-channel data processing system, for operating a safety device, comprising:
   a data input for receiving data to be processed and a data output for connection to the safety device;
   first and second microcomputers, each of said microcomputers including a plurality of input lines connected to said data input and a plurality of output lines and each of said microcomputers operable to process data received on its input lines and produce processed data on its output lines;
   first and second comparators each including an output, first inputs connected to the output lines of said first microcomputer and corresponding second inputs connected to said output lines of said second microcomputer, and each of said comparators operable to provide a first signal at its output in response to receiving equal data from said microcomputers and a second signal at its output in response to receiving unequal data from said microcomputers;

first and second AND gates each including an output, a clock input for receiving clock pulses, and a signal input connected to said output of a respective comparator, said AND gates operable in response to clock pulses and said first signals to produce rectangular pulses at their respective output;

first and second rectifiers, and first, second and third transformers each including a primary and a secondary; and first, second and third pulse amplifiers each including a voltage supply input, a pulse input and an output, said voltage supply input of said first pulse amplifier connected to a voltage supply, said output of said first pulse amplifier connected to said primary of said first transformer and said pulse input connected to said output of said first AND gate, said first pulse amplifier operable in response to the rectangular pulses to cause said first transformer to couple pulses to said secondary of said first transformer, said voltage supply input of said second pulse amplifier connected via said first rectifier to said secondary of said first transformer, said output of said second pulse amplifier connected to said primary of said second transformer and said pulse input of said second pulse amplifier connected to said output of said second AND gate, said second gate amplifier operable in response to the rectangular pulses and the operation of said first pulse amplifier to cause said second transformer to couple pulses to said secondary of said second transformer, said secondary of said third transformer connected to said data output, and said voltage supply input of said third pulse amplifier connected via said second rectifier to said secondary of said second transformer, said output of said third pulse amplifier connected to said primary of said third transformer, and said pulse input connected to one of said microcomputer output lines, said third pulse amplifier operable to control the safety device via said third transformer in response to the operation of said second pulse amplifier and data on said one microcomputer output line.

2. The dual-channel data processing system of claim 1, wherein:
each of said microcomputers includes an internal clock with a clock output connected to said clock input of the respective AND gate.

3. The dual-channel data processing system of claim 1, wherein:
each of said microcomputers includes a control input connected to said output of the respective AND gate which is responsive to said second signal from the respective comparator to become blocked and place the respective microcomputer in a predetermined state.

* * * * *